(12) United States Patent
Snyder et al.

(10) Patent No.: US 6,252,604 B1
(45) Date of Patent: *Jun. 26, 2001

(54) METHOD OF ANIMATING AN IMAGE BY SQUIGGLING THE EDGES OF IMAGE FEATURES

(75) Inventors: Thomas F. F. Snyder, Cambridge; Andre Lyman, Watertown, both of MA (US)

(73) Assignee: Tom Snyder Productions, Inc., Watertown, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/783,290

(22) Filed: Jan. 10, 1997

(51) Int. Cl.[7] .................................................... G06F 15/00
(52) U.S. Cl. ............................................................ 345/433
(58) Field of Search ................... 345/473, 474, 345/475, 433, 435

(56) References Cited

FOREIGN PATENT DOCUMENTS 0 675 461 A2  10/1995  (EP) .
WO 92/09965   6/1992  (WO) .

OTHER PUBLICATIONS

Autodesk Animator Pro Reference Manual, 1991, Autodesk Inc.

*Primary Examiner*—Phu K. Nguyen
(74) *Attorney, Agent, or Firm*—Dike Bronstein Roberts & Cushman IP Group, Edwards & Angell LLP; George W. Neuner

(57) ABSTRACT

A method of simulated animation for video images is disclosed. The method squiggles the features of the images by displaying a number of slightly different images in rapid succession. These slightly different images are generated automatically by a computer in accordance with a set of pre-stored editing routines. To simulate animation of an image, a set of duplicate images is created. These duplicate images are then modified by computer application of pre-stored editing routines, such that small variations result between the duplicate images. The edited duplicate images are then arranged for display in succession. To create an animated sequence comprising a plurality of multi-frame scenes, a plurality of scenes are created from a still image by modifying a set of duplicate still images by computer application of pre-stored editing routines, such that small variations result between the duplicate still images. The pre-stored editing routines comprise sets of cursor position functions, and are created by correlating each cursor position function with a cursor movement consisting of a rectangular array of irregular circles.

21 Claims, 1 Drawing Sheet

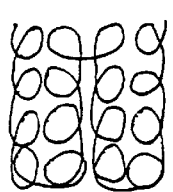 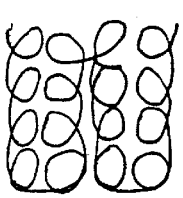 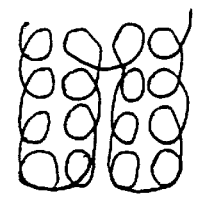 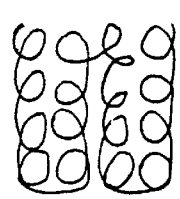 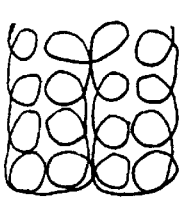
FIG. 2a    FIG. 2b    FIG. 2c    FIG. 2d    FIG. 2e
 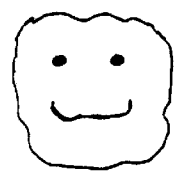 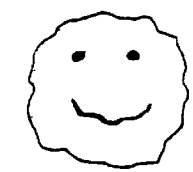 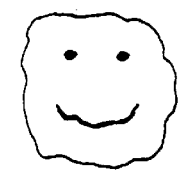 
FIG. 3a    FIG. 3b    FIG. 3c    FIG. 3d    FIG. 3e

METHOD OF ANIMATING AN IMAGE BY SQUIGGLING THE EDGES OF IMAGE FEATURES

BACKGROUND OF THE INVENTION

This invention relates to a method of creating animated video images.

Traditionally, animation has been achieved by displaying multiple images in rapid succession, with the objects in each frame being displaced by a small amount from the objects in the previous frame. When viewed by the human eye, this rapid succession of images is perceived as movement of the objects. When the frame rate is sufficiently high, and the displacement of objects from one frame to another is small, enough, the movement appears to be smooth.

Originally, animation was a very painstaking process in which every frame of the moving image was drawn by hand. More recently, computers have been used to generate the images required to create the appearance of smooth motion. Computerized animation was a major advance over hand-drawn animation, because it eliminated a large portion of the time and labor previously required to produce animation.

Even so, animation remains expensive to implement, because it still requires significant amounts of labor and computer resources.

One existing technique that overcomes these disadvantages, to some extent, is the SQUIGGLEVISION™ simulated animation technique. (SQUIGGLEVISION is a trademark of Tom Snyder Productions, Inc.). With SQUIGGLEVISION™ simulated animation, the edges of objects in the image are squiggled to create an electric-line look instead of actually moving the objects.

The existing method of creating SQUIGGLEVISION™ simulated animation is a manual process: An artist creates a still image and it is manually traced four times, resulting in a total of five very similar versions of the same image. While these five versions are quite similar, there are, in fact, slight random differences between each of the five images as a result of the manual tracing process. Each of the five images is then pasted on to identical copies of a background image. Then, these five images are displayed sequentially in successive video frames in a repeating sequence.

Because of the slight differences between the five images, the edges and features of the character look like they are boiling or squiggling when the sequentially displayed images are viewed by the human eye. The random nature of the inter-image variations introduced by the manual tracing enhances the squiggling effect.

The result is a reduced cost simulation of animation. This technique also advantageously creates the illusion that the characters are three dimensional because different parts of the background, at the edges of the character, are uncovered in the different frames.

The existing manual SQUIGGLEVISION™ simulated animation technique can also be used in conjunction with animation of a character's mouth when a character is talking. The mouth is traced in five different positions which are then displayed in sequence to create the impression that a character is talking.

While this method of producing simulated animation requires far less labor than traditional animation, the tracing and pasting process still requires a significant amount of manual labor. For example, a typical half hour program could contain over 200 still images that must be squiggled. With the manual tracing method described above, 800 manual tracing operations would be required to squiggle all 200 images.

Eliminating this manual step would reduce the cost of the process significantly, and cut the time needed to prepare a program.

Until now, however, efforts to create a simulated animation effect automatically using a computer have been unsuccessful, because random inter-image variations that enhance the squiggling effect are difficult to generate by computer.

SUMMARY OF THE INVENTION

The present invention provides a method for achieving the squiggling effect automatically, without manual tracing, while still maintaining a high quality squiggling effect. By eliminating the manual tracing step, labor costs and time of preparation are drastically reduced.

According to the present invention, a set of duplicate images are created automatically by computer. Then, the computer creates small variations between these duplicate images using a set of pre-stored editing routines.

The great advantage of using pre-stored editing routines to create the variations between the images is that a single set of routines can be used to modify any number of still images. Moreover, when these routines are created manually, the random quality that enhances the squiggling effect can be achieved without requiring an individual manual operation for each still image to be squiggled.

In accordance with one aspect of the invention, a method of simulated animation comprises the step of copying an original image at least once, resulting in a plurality of duplicate images, and storing the duplicate images in a computer memory. The stored duplicate images are edited by activating a computerized image editing function that modifies an image in accordance with a stored cursor position function to create a plurality of edited images, wherein each edited image of the plurality of edited images is created using a different one of a plurality of stored cursor position functions. Finally, the edited images are arranged for display in succession.

In accordance with another aspect of the invention, a method of creating an animated show comprising a plurality of multi-frame scenes is provided. According to this method, each of the scenes is created from a still image according to a method that comprises the step of copying an original image at least once, resulting in a plurality of duplicate images, and storing the duplicate images in a computer memory. The stored duplicate images are edited by activating a computerized image editing function that modifies an image in accordance with a stored cursor position function to create a plurality of edited images, wherein each edited image of the plurality of edited images is created using a different one of a plurality of stored cursor position functions. Finally, the edited images are arranged for display in succession, repeatedly, for a duration of the scene.

In accordance with yet another aspect of the invention, a method of creating a set of cursor position functions intended for use in conjunction with an image editing function is provided. This method comprises the step of recording independently, for each cursor position function of the set, a movement of a cursor, wherein the movement comprises a rectangular array of hand-drawn, irregular circles.

Yet another aspect of the invention is directed to an animated show stored on a medium, the show comprising a plurality of multi-frame scenes wherein each of the scenes is created from a still image. Each of the scenes is created according to a method that comprises the step of copying an original image at least once, resulting in a plurality of duplicate images, and storing the duplicate images in a computer memory. The stored duplicate images are edited by activating a computerized image editing function that modifies an image in accordance with a stored cursor position function to create a plurality of edited images, wherein each edited image of the plurality of edited images is created using a different one of a plurality of stored cursor position functions. Finally, the edited images are arranged for display in succession, repeatedly, for a duration of the scene.

In yet another aspect of the invention, a method of animation is provided that comprises the steps of copying an original image at least once, resulting in a plurality of duplicate images, accessing a plurality of pre-stored image editing routines, editing each image of the plurality of duplicate images in accordance with a different one of the plurality of image editing routines, resulting in a plurality of edited images, and arranging a sequence of the edited images for sequential display.

BRIEF DESCRIPTION OF THE DRAWINGS

FIGS. 2a–2e are schematic representations of five pre-stored cursor paths.

FIGS. 3a–3e are the images resulting from the editing of the image of FIG. 1 using the pre-stored cursor paths of FIGS. 2a–2e, respectively.

DETAILED DESCRIPTION OF THE PREFERRED EMBODIMENTS

Figure 1:
FIG. 1 is an image which is to be squiggled according to the method of the present invention.

FIG. 1 is an example of an image to be squiggled according to the method of the present invention.

FIGS. 3a–3e are the edited images created from the image of FIG. 1. When these edited images are displayed in rapid succession, the squiggling simulated animation effect is achieved. Each of these edited images is created automatically using a pre-stored editing routine.

In a preferred embodiment, each pre-stored editing routine comprises a pre-stored cursor position function that determines a cursor path. The cursor position function is used in conjunction with an image editing function that shifts pixels, depending on the position of the cursor. A preferred process of squiggling an original image using these pre-stored cursor position functions will be described first, followed by a description of a preferred process of making a suitable set of cursor position functions.

The first step in making the first edited image 3a is to make an exact duplicate of the original image shown in FIG. 1. Then, an image editing function is activated. Next, the cursor is automatically moved along the path determined by the cursor position function. The path of the cursor is shown schematically in FIG. 2a. Because the image editing function is activated, the image is squiggled as the cursor moves along the path. The resulting video image, shown in FIG. 3a, is then stored in memory.

The same process is repeated, using the pre-stored paths shown in FIGS. 2b–2e to create the edited images of FIGS. 3b–3c, respectively. This results in a set of five edited images which are similar, but not identical, to the original image depicted in FIG. 1. The edited images are not exactly identical to one another because a different cursor path is followed when the image editing function is invoked for each of the five duplicate images.

After the set of five edited images are obtained, each of the images is pasted on an identical background. This pasting may be done mechanically, by using an adhesive, or electronically, by using the paste function of a drawing software package. If an electronic paste function is used, the background of the original image should be transparent to allow the identical background to show through. After the images are pasted on the background, the composite images are displayed in rapid sequence, as they were in the manual SQUIGGLEVISION™ simulated animation method described above. A frame rate of 12 frames per second results in a suitable animated picture. The original, unedited image may optionally be included as one of the images in the display sequence, because it is similar, but not identical, to each of the edited images.

Using a set of pre-stored editing routines to squiggle each duplicate image represents a significant improvement over the manual SQUIGGLEVISION™ simulated animation method. This is because a single set of pre-stored cursor position functions can be used repeatedly to edit any number of still images. As a result, once a set of cursor position functions has been created, the squiggling process can be performed automatically, with a minimum amount of human labor, for all of the images in any given animated show.

One embodiment of the present invention uses the ANI-MATOR PRO software by AUTODESK to provide the image editing function, and uses a recorded macro to provide the pre-stored cursor position function, as described below. The Autodesk Animator Pro Reference Manual, published by Autodesk Inc., is incorporated herein by reference.

In order for the recorded macro to successfully squiggle an image onto a background, a 2-page "flic" must first be created. Page 1 contains the image, or in this case a figure, only. This image must have a transparent color as its background. Page 2 contains the background only, onto which the image of page 1 will eventually be pasted.

With the two page "flic" loaded and page 1 showing, the previously recorded macro is loaded by selecting "EXTRA". After a drop down menu appears, select "RECORD", select "FILES", select "LOAD", double click on file titled "SQUIGL", then select "EXIT". Finally, "USE MACRO" is selected to run the loaded macro.

The macro "inserts" page 1, four times, to create a total of 5 exact duplicates of the original figure (counting the original). These pages are now numbered as pages 1–5, and the original page 2 is moved up to page 6. The macro them selects the "SMEAR" tool in conjunction with a "32" size brush, which is the largest brush size available. The smear function drags colors gently in direction of cursor motion. In order for the smear function to be properly selected, the smear tool icon must be in the exact location on the display as it was originally when the macro was first recorded, because the macro will automatically pick whatever tool is currently located at that location. For example, if the "soften" tool is located in the location reserved for smear, then the macro will pick "soften" and soften the image instead of smearing it, which is not the desired effect.

After the macro selects the smear function, starting with page 1, the macro proceeds to move the cursor. The macro moves the cursor using small circular motions, starting from the upper left corner of the screen and traveling vertically downward, mimicking the vertical lines of a grid-like pattern which spans the entire surface area of the screen. The grid is invisible during the macro playback. Once the cursor reaches the bottom, it continues to follow the next vertical line of the grid in an upward direction. The macro continues to move the cursor in small circular motions, going up one column and down the next, until it reaches the bottom right corner of the screen. This pattern assures that virtually every pixel of the image is manipulated by the smear tool, and that virtually no pixel remain un-smeared.

FIG. 2a is a schematic illustration of the cursor path followed in this example for page 1. This representation is schematic because FIG. 2a depicts a four by four array of circles, while in fact an array of circles 17 high by 22 across is used.

After page 1 has been manipulated, page 2 is selected and the process is repeated. This process continues for each of the five pages created from the original "figure" page. Each page however, uses different cursor position functions that define different cursor paths, so there are slight discrepancies in the path followed by the cursor on each page. FIGS. 2b–2e are schematic illustrations of the cursor paths followed for pages 2–5.

The variations in the cursor position function used for each of pages 1–5, used in conjunction with the smear function, result in a set of edited images that are substantially similar. However, no two of the edited images are exactly alike. FIGS. 3a–3e are schematically illustrations of the resulting edited images of pages 1–5.

Once the macro completes page 5, the macro "inserts" page 6 (which contains the background and was originally numbered page 2), four times. This results in a total of 5 duplicates of the background page, now numbered as pages 6–10. At this point, the "flic" is 10 pages long and contains 5 slightly varied versions of the figure (at pages 1–5), and five exact duplicates of the background (at pages 6–10).

Next, the macro clips and pastes the images on pages 1 through 5 onto pages 6 through 10, respectively. Because the backgrounds of the images on pages 1 through 5 are transparent, the original background of pages 6 through 10 remains visible on the pasted images. Finally, the macro deletes pages 1 through 5. The result is a five page "flic" that can be played back as a loop.

In this way, the image from page 1 of the original starting "flic", has successfully been manipulated over 5 pages and individually pasted over the un-manipulated background image from page 2 of the original starting "flic". When the resulting "flic" is played back, the figure "squiggles" on the fixed background, with the appearance of an "electric-line". The differences between the edited images produced by this process exhibit a human-like quality that, while not identical to the differences achieved by repeatedly tracing the original image in the manual method, is perceived as similar by human observers. The squiggling effect can be sustained for any given duration by repeating the playback loop an appropriate number of times.

By displaying a number of scenes in sequence, with each scene comprising a still image that has been squiggled according to the process described above, an entire animated show can be created.

The macro in this example was created by recording five individual cursor paths, with each of those paths using small, circular motions arranged about a grid. Other cursor paths may be used as well. In addition, while the above example uses the "smear" function of AUTODESK's ANIMATOR PRO, other functions and other software programs may also be used. Appropriate image editing functions could bend, stretch, or otherwise change the edges of image features depending on the position of the cursor.

When the pre-stored cursor position functions are created by hand, slight variations in the cursor paths result in corresponding variations in the edited images. This effect simulates the effect achieved by using the manual-tracing technique. It should be noted, however, that manual creation of the pre-stored cursor position functions is not necessary, and computer generated cursor position functions may be used as well. Preferably, these computer generated cursor position functions should use random or pseudo-random paths.

Alternatively, instead of using an image editing function along with a pre-stored cursor position function to simulate manual operation of the image editing function, the image can be manipulated directly by a pre-stored editing routine comprising an appropriate function. For example, image edges can be detected, and pseudo-random variations can be introduced in a direction perpendicular to tangents to those edges. Numerous other direct-manipulation editing routines can be used as well.

While the present invention has been described above in terms of specific embodiments, it is to be understood that the invention is not limited to the disclosed embodiments. On the contrary, the present invention is intended to cover various modifications and equivalent methods included within the spirit and scope of the appended claims.

What is claimed is:

1. A method of simulated animation on a computer having a plurality of different cursor position functions stored in a computer memory, comprising the steps of:
    duplicating an original image at least once, to create a plurality of duplicate images, and storing said duplicate images in the computer memory;
    editing said stored duplicate images by
        activating a computerized image editing function that modifies the duplicate image in accordance with one of the plurality of stored cursor position functions, and
        moving a cursor along a path determined by the one of the plurality of stored cursor position functions to edit the duplicate image, and
    arranging a sequence of said edited images on a background for display in succession,
    wherein at least some of the edited images are created using different ones of the plurality of stored cursor position functions.

2. The method according to claim 1, wherein said duplicating step is performed using a computer.

3. The method according to claim 1, wherein the sequence of edited images consists of five edited images.

4. The method according to claim 1, wherein a duplicate image is inserted into the sequence of edited images.

5. The method according to claim 1, wherein the sequence of edited images consists of four edited images and a duplicate image is inserted into the sequence of edited images.

6. The method according to claim 1, wherein the sequence of edited images comprises at least three edited images.

7. The method according to claim 1, wherein the image editing function smears pixels in a direction of the cursor.

8. The method according to claim 7, wherein the image editing function comprises the "smear" function of AUDODESK ANIIMATOR PRO.

9. The method according to claim 1, wherein each of the cursor position functions comprises a plurality of imperfect circles arranged about a grid.

10. The method according to claim 1, further comprising the step of arranging for the repeated display of the sequence of edited images.

11. The method according to claim 1, in which the step of arranging a sequence of said edited images on a background further comprises the step of pasting each of the edited images onto an identical background.

12. The method according to claim 1, further comprising the step of displaying the sequence of edited images in rapid succession.

13. The method according to claim 1, wherein each of the cursor position functions is created by hand.

14. A method of creating an animated show comprising a plurality of multi-frame scenes, on a computer having a plurality of different cursor position functions stored in a computer memory, wherein each of the scenes is created from a still image according to a method comprising the steps of:

duplicating an original image at least once, to create a plurality of duplicate images, and storing said duplicate images in the computer memory;

editing said stored duplicate images by activating a computerized image editing function that modifies each duplicate image in accordance with one of the plurality of different stored cursor position function to create a plurality of edited images, moving a cursor along a path determined by the one of the plurality of stored cursor position functions to edit the duplicate image, and arranging a sequence of said edited images on a background for display in repeated succession, wherein at least some of the edited images are created using different ones of the plurality of stored cursor position functions.

15. An animated show stored on a medium, said show comprising a plurality of multi-frame scenes wherein each of said scenes is created from a still image by a computer having a plurality of different cursor position functions stored in a computer memory, according to a method comprising the steps of:

duplicating an original image at least once, to create a plurality of duplicate images, and storing said duplicate images in the computer memory;

editing said stored duplicate images by activating a computerized image editing function that modifies each image in accordance with one of the plurality of stored cursor position functions to create a plurality of edited images, and moving a cursor along a path determined by the one of the plurality of stored cursor position functions to edit the duplicate image, and arranging a sequence of said edited images on a background for display in repeated succession, wherein each edited image of said plurality of edited images is created using a different one of the plurality of stored cursor position functions.

16. A method of animation, comprising the steps of:

duplicating an original image at least once, to create in a plurality of duplicate images;

accessing a plurality of pre-stored different image editing routines;

editing each image of the plurality of duplicate images in accordance with a different one of the plurality of image editing routines, to create a plurality of different edited images; and arranging a sequence of said edited images for sequential display.

17. The method according to claim 16, further comprising the step of arranging for a repeated display of the sequence of said edited images.

18. The method according to claim 16, further comprising the step of pasting each of the edited images onto an identical background.

19. The method according to claim 16, further comprising the step of displaying the sequence of edited images in rapid succession.

20. The method according to claim 16, wherein a duplicate image is inserted into the sequence of edited images.

21. The method of creating a set of cursor position functions use in conjunction with an image editing function, the method comprising the step of:

storing independently, for each cursor position function of the set, a movement of a cursor comprising a rectangular array of hand-drawn, irregular circles.

\* \* \* \* \*